(12) United States Patent
Hellmig et al.

(10) Patent No.: US 7,864,645 B2
(45) Date of Patent: Jan. 4, 2011

(54) METHOD AND DEVICE FOR RECORDING MARKS IN AN INFORMATION LAYER OF AN OPTICAL RECORD CARRIER

(75) Inventors: Joachim Wilhelm Hellmig, Eindhoven (NL); Jan Matthijs Ter Meulen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 529 days.

(21) Appl. No.: 10/475,887

(22) PCT Filed: Apr. 22, 2002

(86) PCT No.: PCT/IB02/01445

§ 371 (c)(1),
(2), (4) Date: Oct. 23, 2003

(87) PCT Pub. No.: WO02/089121

PCT Pub. Date: Nov. 7, 2002

(65) Prior Publication Data

US 2004/0130994 A1 Jul. 8, 2004

(30) Foreign Application Priority Data

Apr. 26, 2001 (EP) .................................. 01201531

(51) Int. Cl.
*G11B 7/0045* (2006.01)

(52) U.S. Cl. .................................. 369/59.11; 369/47.51

(58) Field of Classification Search ... 369/59.11–59.12, 369/116, 44.37–44.38, 47.49–47.53, 53.16–53.17, 369/53.22, 53.25–53.28, 53.35–53.36, 59.23–59.24
See application file for complete search history.

(56) References Cited

U.S. PATENT DOCUMENTS

| 5,109,373 | A | * | 4/1992 | Ohno et al. | 369/59.11 |
| 5,241,524 | A | * | 8/1993 | Lee | 369/59.12 |
| 5,400,313 | A | | 3/1995 | Belser et al. | |
| 5,412,626 | A | | 5/1995 | Ohno et al. | 369/13 |
| 5,732,062 | A | | 3/1998 | Yokoi et al. | 369/116 |
| 6,236,635 | B1 | * | 5/2001 | Miyamoto et al. | 369/116 |
| 6,411,579 | B2 | * | 6/2002 | Nobukuni et al. | 369/59.12 |
| 2001/0043540 | A1 | * | 11/2001 | Tieke et al. | 369/59.11 |

FOREIGN PATENT DOCUMENTS

| EP | 0405610 A2 | 1/1991 |
| EP | 0594425 A2 | 4/1994 |

OTHER PUBLICATIONS

Patent Abstracts of Japan for JP 2000-268367 A, Sep. 29, 2000.*
Patent Abstracts of Japan for JP 11-175976 A, Jul. 2, 1999.*

\* cited by examiner

*Primary Examiner*—Wayne R Young
*Assistant Examiner*—Nathan A Danielsen

(57) ABSTRACT

A method and recording device for recording marks in a phase-change type record carrier uses increased cooling period between pulses in a sequence of write pulses by applying m write pulses, where m is depended on $n/\alpha$ ($\alpha$ being an integer larger than 1). The number of write pulses m may be set to the integer value closest to $n/\alpha$.

8 Claims, 2 Drawing Sheets

Figure 1:
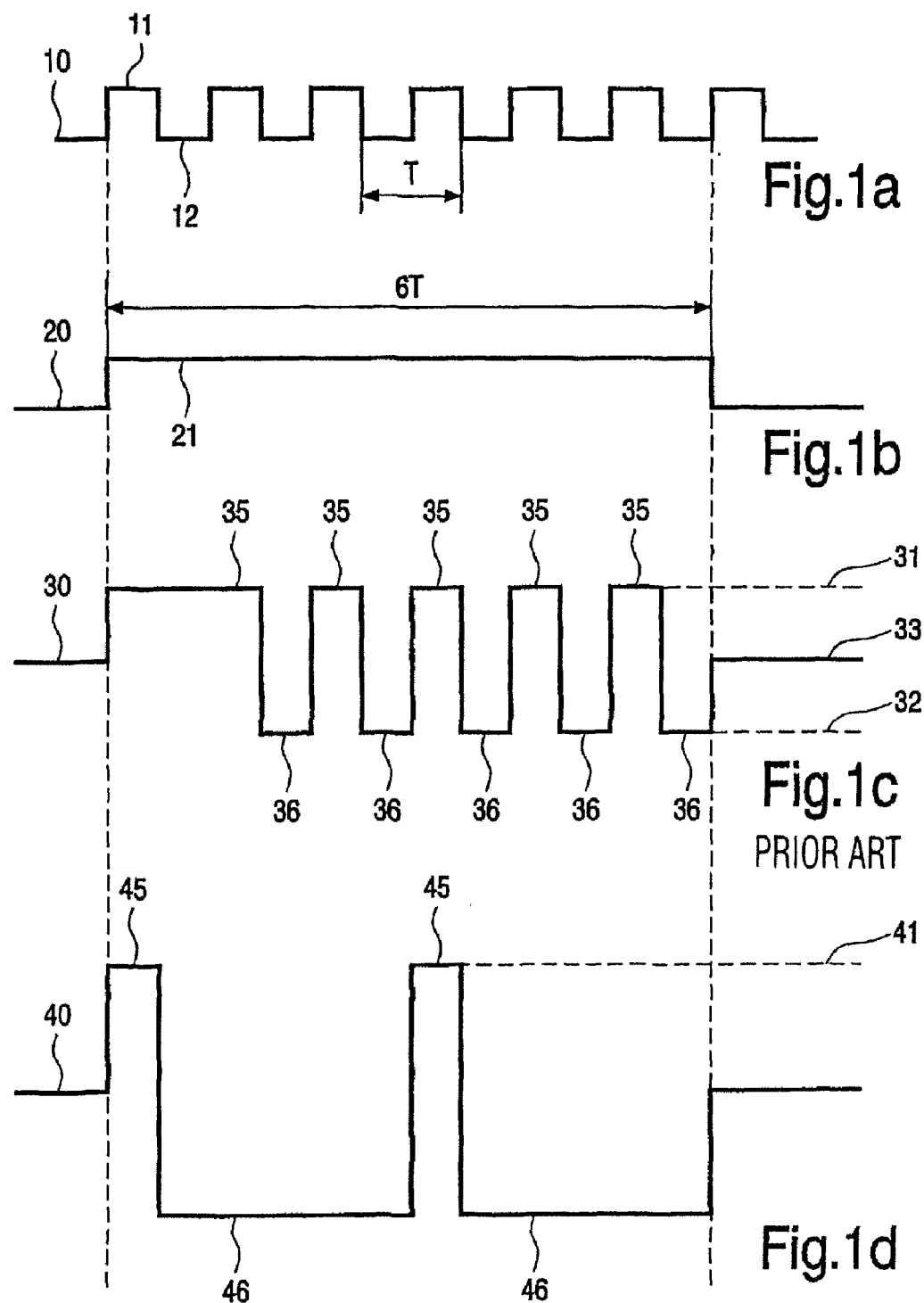

METHOD AND DEVICE FOR RECORDING MARKS IN AN INFORMATION LAYER OF AN OPTICAL RECORD CARRIER

The invention relates to a method of recording marks having a time length of nT in a record carrier, said record carrier comprising an information layer having a phase reversibly changeable between a crystal phase and an amorphous phase, by irradiating the information layer by a pulsed radiation beam, each mark being written by a sequence of m pulses n represents an integer larger than 1, T represents the length of one period of a reference clock, and m represents an integer larger than or equal to 1 and lower than or equal to n.

The invention also relates to a recording device for recording marks in a record carrier, said record carrier comprising an information layer having a phase reversibly changeable between a crystal phase and an amorphous phase, capable of carrying out the above method.

An information layer having a phase reversibly changeable between a crystal phase and an amorphous phase is generally known as a phase-change layer. A recording operation of optical signals is performed in such a manner that the recording material in this layer is changed in phase reversibly between an amorphous phase and a crystalline phase by changing the irradiation conditions of a radiation beam thereby to record the signals in the phase-change layer, while a playback operation of the recorded signals is performed by detecting differences in optical properties between the amorphous and crystalline phases of the phase-change layer thereby to produce the recorded signals. Such a phase-change layer allows information to be recorded and erased by modulating the power of the radiation beam between a write power level and an erase power level.

A method according to the preamble for recording information in a phase-change layer of a record carrier is known for example from the U.S. Pat. No. 5,412,626. An nT mark is recorded by a sequence of n−2 write pulses having a write power level. The previously recorded marks between the marks being recorded are erased by applying an erase power in between the sequences thus allowing this method to be used in a direct-overwrite (DOW) mode, i.e., recording information to be recorded in the information layer of the record carrier and at the same time erasing information previously recorded in the information layer.

U.S. Pat. No. 5,732,062 discloses an alternative method according to the preamble. Here a nT mark is recorded by a sequence of n−1 write pulses. To compensate for heat accumulated during recording of a previous respectively a following mark being recorded the write power level of the first respectively the last write pulse in the sequence of pulses is higher than that of the remaining write pulses in that sequence. The heat accumulation causes distortion of the recorded marks.

An increase of the capacity of the record carrier by a factor of two can easily be achieved by introducing a second information layer. To be able to access both information layers, the layer closer to the radiation source should preferably be completely or partially transparent. Such a transparent information layer requires a change of the information layer stack-design. A standard stack of an information layer of the phase-change type consists of a metal mirror layer, dielectric interference layers and a phase-change layer. However, an information layer having such a stack is not transparent because of the metal mirror layer. Therefore, this metal mirror layer should be removed from the stack.

However, it is observed that leaving out the metal mirror layer from the stack of the information layer results in marks which are of low quality when the known methods are used for recording these marks. These marks have, for example, a reduced mark length. Furthermore, it is often observed that these marks result in a reduced modulation of the reproduced recorded signals during playback (the modulation being the difference in the amplitude of the signal resulting from an area on the information layer having a mark to the amplitude of the signal resulting from an area on the information layer having no mark).

It is an object of the invention to provide a method of recording marks of the kind described in the opening paragraph which method results in recorded marks of good quality (i.e., correct mark length and resulting in reproduced recorded signals during playback having sufficient modulation to reproduce the recorded information).

This object is achieved when the method of the preamble is characterized in that m is set in dependence on n/α, α being an integer larger than 1.

It was observed that leaving out the metal mirror layer from the stack of the information layer not only has consequences for the optical behavior of the information layer, but apparently also for its thermal characteristics. The metal has a much higher heat conductivity than the interference layers and the phase-change layer. This heat conductivity of the metal mirror layer appears to be advantages for the actual writing process of amorphous marks. During the writing process the phase-change material is heated to several hundred degrees Celsius by the write pulse. Subsequently, the phase-change material is cooled rapidly to prevent re-crystallization of the molten (i.e., amorphous) material. For this process to be successful, it is necessary that the cooling time is shorter than the re-crystallization time. The large heat conductivity and heat capacity of the metal mirror layer help to remove the heat quickly from the molten phase-change material. However, in a (semi-) transparent information layer without, or with a reduced amount of, such a cooling metal mirror layer, the cooling time seems to become longer giving the phase-change material time to re-crystallize. This results in the marks of low quality.

The method according to the invention allows for a longer cooling period in between two succeeding write pulses in a sequence of write pulses. This increased cooling period results in marks having a good quality.

With the known methods, a mark having a time length of nT is recorded by a sequence of write pulses containing n−2 respectively n−1 write pulses. Especially for the longer marks, this results in a large number of write pulses and consequently in a large amount of heat being accumulated in the phase-change layer without a sufficient possibility to cool down in between the write pulses. However, in an embodiment of the method according to the invention in which the number of write pulses (m) is set equal to the nearest integer closest to n/α (m≧1), the number of write pulses are reduced resulting in a significant increase of the cooling period in between the write pulses.

In a further embodiment of the method, the number of write pulses (m) is set equal to the nearest integer larger than or equal to n/α (m≧1).

Good results are already obtained by setting α to a value of 2. An further improvement is obtained in a preferred embodiment of the method according to the invention in which α is set to a value of 3 resulting in even longer cooling intervals in between the write pulses in a sequence of write pulses. In this embodiment of the method, a 6 T marks is recorded using a sequence of write pulses comprising only 2 write pulses while in the known methods the sequence would contain 4 (n−2) respectively 5 (n−1) write pulses.

When a nT marks is recorded by a sequence of m write pulses, m being the nearest integer larger than or equal to n/α, α different mark lengths are recorded by the same number of write pulses in a sequence of write pulses. For example, when α is set to 3 a 4 T, a 5 T and a 6 T marks are all recorded by a sequence of 2 write pulses. Because of this an additional fine tuning of the write pulses may be required. In an embodiment of the method according to the invention the position of at least one of the write pulses in the sequence is set in dependence on n. In an further embodiment of the method according to the invention the power of at least one of the write pulses in the sequence is set in dependence on n. In an further embodiment of the method according to the invention the duration of at least one of the write pulses in the sequence is set in dependence on n.

Adjustment of the parameters mentioned above (i.e., pulse position, pulse power, pulse duration) in dependence of n may be applied to a single parameter only or to any combination of these parameters. Moreover, these parameters may be adjusted for a single pulse in the sequence of write pulses or, alternatively, for several pulses in the sequence of pulses.

When the peak write power level is limited (because of the radiation source or because of limitations imposed by the record carrier), it is especially advantages to adjust to pulse duration so as to obtain longer write pulse thereby increasing the total write power. The ability to use a longer pulse duration, in general allows for the use of lower radiation powers.

It is noted that the method according to the invention can advantageously be used in any high speed optical recording system using a record carrier comprising a single information layer or multiple information layers of the phase-change type where the cooling time becomes critical. In these systems the cooling time during recording becomes shorter due to the rapid sequence of write pulses. A longer cooling period, as introduced by the method according to the invention, allows for a longer cooling period.

It is a further object of the invention to provide a recording device for carrying out the method according to the invention.

This object is achieved when the recording device of the preamble is characterized in that it comprises means for carrying out anyone of the methods according to the invention.

Figure 2:
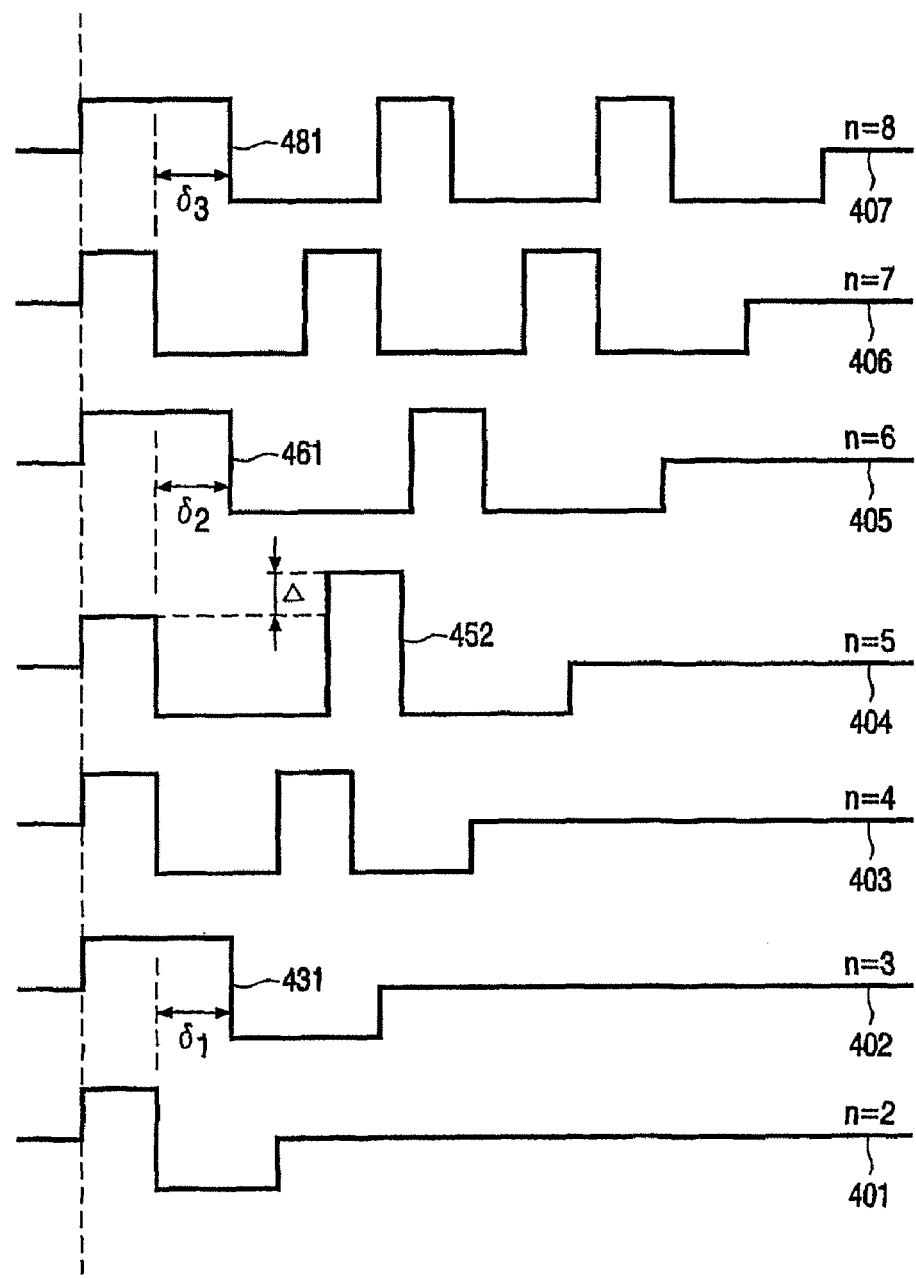

These and other objects, features and advantages of the invention will be apparent from the following more particular description of an embodiment of the invention, as illustrated in the accompanying drawings where FIGS. 1a - 1d show diagrams representing a known method and a method according to the invention for recording a 6 T mark, and FIG. 2 shows diagrams representing a method according to the invention for recording marks having a time length from 2 T to 8 T.

FIG. 1a shows a clock signal 10 of a reference clock having a 'high' part 11 and a 'low' part 12. A combination of one 'high' part and one 'low' part together form one period T of this reference clock. FIG. 1b shows a signal 20 to be recorded in the information layer of the record carrier. A 'high' part 21 in this signal 20 is recorded in the information layer as a mark having a length corresponding to the duration of this 'high' part. The length of a marks is often expressed in the number of corresponding reference clock periods T. In this example the length of the mark to be recorded, and therefore of the 'high' part 21 of the signal 20, is 6 T.

The signal 20 to be recorded is recorded in an information layer having a phase reversibly changeable between a crystalline phase and an amorphous phase by irradiation a radiation beam onto that information layer. The radiation beam is generated by a radiation source which is controlled by a control signal 30, 40. The power level of this control signal corresponds to the power of the radiation beam irradiated by the radiation source. FIG. 1c shows a pulsed control signal 30 applied in a method known from prior art. When recording a 6 T mark, a sequence of write pulses in this control signal 30 comprises 5 (i.e., n−1) write pulses 35 having a write power level 31. In between the write pulses 35 in the sequence of write pulses are cooling periods 36. Before and after the sequence of write pulses, the control signal 30 has an erase power level 33 sufficient for erasing previously recorded marks.

FIG. 1d shows a pulsed control signal 40 applied in a method according to the invention where a is set to 3. When recording a 6 T mark, the sequence of write pulses in this control signal 40 comprises only 2 (i.e., n/3) write pulses 45 having a write power level 41. In between the write pulses 41 in this sequence of write pulses are cooling periods 46. The duration of these cooling periods 46 is significantly increased with respect to the cooling periods 36 while the length of the mark to be recorded remains the same. Because of these increased cooling periods no re-crystallization occurs and the length of the actual recorded marks corresponds very well to the desired length (i.e., 6 T). When applying the method known from the prior art (i.e., control signal 30), an accumulation of heat in the phase change layer will occur resulting in a re-crystallization effect and therefore in a actual recorded mark which is significantly shorter than the desired length of 6 T.

FIG. 2 shows control signals 401 to 407 for recording marks having a length of 2 T to 8 T applying a method according to the invention where α is set to 3. Because α is set to 3, a 2 T and a 3 T mark are recorded by a sequence of 1 write pulses; a 4 T, 5 T and 6 T mark are recorded by a sequence of 2 write pulses; and a 7 T and a 8 T mark are recorded by a sequence of 3 write pulses. Additional fine-tuning depended on n is applied: write pulses 431, 461 and 481 have an extended duration while write pulse 452 has an increased write power level 455.

It should be noted that the above described embodiment illustrates rather that limits the invention, and that those skilled in the art will be able to design alternatives without departing from the scope of the appended claims. It is especially noted that the invention is not limited to the use with multi-layer record carriers only. As described earlier, the invention is also particular advantageous when applied in high speed recording systems.

The invention claimed is:

1. A method of recording marks having a time length of nT, n representing an integer larger than 1 and T representing the length of one period of a reference clock, in a record carrier, the value of n changing at times for subsequent marks depending on information being written to the record carrier, said record carrier comprising an information layer having a phase reversibly changeable between a crystal phase and an amorphous phase, the method comprising the acts of:

irradiating the information layer by a pulsed radiation beam, and writing each mark with a sequence of m pulses, m representing an integer larger than or equal to 1 and lower than or equal to n, wherein m is set to the nearest integer larger than or equal to n/α, α being an integer equal to 3, α being independent of n, and α being constant for multiple subsequent marks, wherein said pulse sequence is altered when a same value of m is determined for different values of n, said alteration being dependent upon n in the form of at least one of: extended pulse duration and different pulse amplitudes.

2. The method as claimed in claim 1, wherein the position of at least one pulse in the sequence of pulses is set in dependence on n.

3. The method as claimed in claim 1, wherein the power of at least one pulse in the sequence of pulses is set in dependence on n.

4. The method as claimed in claim 1, wherein the duration of at least one pulse in the sequence of pulses is set in dependence on n.

5. A recording device for recording marks having a time length of nT, n representing an integer larger than 1 and T representing the length of one period of a reference clock, in a record carrier, the value of n changing at times for subsequent marks depending on information being written to the record carrier, said record carrier comprising an information layer having a phase reversibly changeable between a crystal phase and an amorphous phase, the recording device comprising:

means for irradiating the information layer by a pulsed radiation beam, and means for writing each mark by a sequence of m pulses, m representing an integer larger than or equal to 1 and lower than or equal to n, wherein m is set to the nearest integer larger than or equal to $n/\alpha$, $\alpha$ being an integer equal to 3, $\alpha$ being independent of n, and $\alpha$ being constant for multiple subsequent marks, wherein said pulse sequence is altered when a same value of m is determined for different values of n, said alteration being dependent upon n in the form of at least one of: extended pulse duration and different pulse amplitudes.

6. The recording device of claim 5, wherein the position of at least one pulse in the sequence of pulses is set in dependence on n.

7. The recording device of claim 5, wherein the power of at least one pulse in the sequence of pulses is set in dependence on n.

8. The recording device of claim 5, wherein the duration of at least one pulse in the sequence of pulses is set in dependence on n.

* * * * *